United States Patent
Damgård et al.

(10) Patent No.: US 10,803,194 B2
(45) Date of Patent: *Oct. 13, 2020

(54) SYSTEM AND A METHOD FOR MANAGEMENT OF CONFIDENTIAL DATA

(71) Applicant: SEPIOR ApS, Aarhus (DK)

(72) Inventors: Ivan Bjerre Damgård, Åbyhøj (DK); Thomas Pelle Jakobsen, Århus C (DK); Jakob Illeborg Pagter, Århus V (DK)

(73) Assignee: SEPIOR ApS, Aarhus (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,184

(22) Filed: Jun. 10, 2019

(65) Prior Publication Data

US 2019/0294811 A1    Sep. 26, 2019

Related U.S. Application Data

(63) Continuation of application No. 15/030,906, filed as application No. PCT/EP2014/072491 on Oct. 21, 2014.

(30) Foreign Application Priority Data

Oct. 28, 2013   (EP) ..................................... 13190481

(51) Int. Cl.
G06F 21/62     (2013.01)
H04L 9/08      (2006.01)
H04L 29/06     (2006.01)

(52) U.S. Cl.
CPC .......... *G06F 21/6218* (2013.01); *H04L 9/085* (2013.01); *H04L 9/088* (2013.01);
(Continued)

(58) Field of Classification Search
CPC ............ G06F 21/6218; H04L 63/0428; H04L 9/0861; H04L 63/062; H04L 63/06; H04L 9/088; H04L 9/0819; H04L 9/085
See application file for complete search history.

(56) References Cited

U.S. PATENT DOCUMENTS 5,315,658 A * 5/1994 Micali ................... G06Q 20/00
                                                       380/28
5,787,175 A * 7/1998 Carter ................. G06F 21/6209
                                                    707/999.008

(Continued)

FOREIGN PATENT DOCUMENTS

EP          2503480          9/2012

OTHER PUBLICATIONS

Search Query Report from IP.com (performed Jun. 4, 2020).*
(Continued)

*Primary Examiner* — Sharon S Lynch
(74) *Attorney, Agent, or Firm* — McHale & Slavin, P.A.

(57) ABSTRACT

A system and a method for managing confidential data in a cloud service is provided. The system comprises a cryptographic key service comprising two or more cryptographic key servers, $S_i$, each being arranged to compute file encryption keys, $k_j$, on the basis of information regarding data and using one or more cryptographic keys, $K_j$. The cryptographic keys, $K_j$, are secretly shared among the cryptographic key servers, $S_i$, and none of the cryptographic key servers, $S_i$, possesses knowledge of all of the cryptographic keys, $K_j$. A single point of trust at the cryptographic key service is avoided.

11 Claims, 5 Drawing Sheets

(52) U.S. Cl.
CPC .......... *H04L 9/0819* (2013.01); *H04L 9/0861* (2013.01); *H04L 63/0428* (2013.01); *H04L 63/06* (2013.01); *H04L 63/062* (2013.01)

(56) References Cited

U.S. PATENT DOCUMENTS

| | | | | | |
|---|---|---|---|---|---|
| 5,862,346 | A * | 1/1999 | Kley | ................. | G06Q 10/10 709/200 |
| 5,940,507 | A * | 8/1999 | Cane | ................. | G06F 21/6245 380/277 |
| 6,026,163 | A * | 2/2000 | Micali | ................. | G06Q 20/085 380/286 |
| 6,049,613 | A * | 4/2000 | Jakobsson | ................. | H04L 9/06 380/28 |
| 6,587,946 | B1 * | 7/2003 | Jakobsson | ................. | H04L 63/02 380/286 |
| 6,687,822 | B1 * | 2/2004 | Jakobsson | ................. | H04L 9/3268 713/156 |
| 7,139,917 | B2 * | 11/2006 | Jablon | ................. | H04L 9/0844 713/183 |
| 7,178,021 | B1 * | 2/2007 | Hanna | ................. | G06F 21/6209 713/150 |
| 7,181,017 | B1 * | 2/2007 | Nagel | ................. | H04L 9/0825 380/282 |
| 7,509,492 | B2 * | 3/2009 | Boyen | ................. | G06F 21/602 380/259 |
| 7,711,122 | B2 * | 5/2010 | Allen | ................. | H04L 9/0825 380/277 |
| 7,792,300 | B1 * | 9/2010 | Caronni | ................. | G06Q 20/3829 380/259 |
| 8,094,810 | B2 * | 1/2012 | Hohenberger | ................. | H04L 9/3013 380/28 |
| 8,316,237 | B1 * | 11/2012 | Felsher | ................. | H04L 9/0825 380/282 |
| 8,353,015 | B2 * | 1/2013 | Carpenter | ................. | G06F 21/6218 726/5 |
| 8,437,474 | B2 * | 5/2013 | Zheng | ................. | H04L 9/0833 380/255 |
| 8,478,996 | B2 * | 7/2013 | Banerjee | ................. | G06F 21/6218 713/165 |
| 8,515,058 | B1 * | 8/2013 | Gentry | ................. | H04L 9/008 380/28 |
| 8,588,425 | B1 * | 11/2013 | Harwood | ................. | H04L 9/0894 380/278 |
| 8,873,754 | B2 * | 10/2014 | Xu | ................. | H04L 9/0861 380/255 |
| 8,904,181 | B1 * | 12/2014 | Felsher | ................. | H04L 9/0825 380/282 |
| 9,037,870 | B1 * | 5/2015 | Zheng | ................. | G06F 12/1408 380/273 |
| 9,049,023 | B2 * | 6/2015 | Green | ................. | H04L 9/3073 |
| 9,158,933 | B2 * | 10/2015 | Banks | ................. | H04L 9/0891 |
| 9,397,983 | B2 * | 7/2016 | Moffat | ................. | H04L 63/0428 |
| 9,419,951 | B1 * | 8/2016 | Felsher | ................. | H04L 9/0825 |
| 9,635,001 | B2 * | 4/2017 | Kaseda | ................. | H04L 63/0464 |
| 10,187,347 | B2 * | 1/2019 | Moffat | ................. | H04L 9/0894 |
| 10,587,563 | B2 * | 3/2020 | Moffat | ................. | H04L 63/0421 |
| 2002/0199110 | A1 * | 12/2002 | Kean | ................. | G06F 21/76 713/189 |
| 2003/0079120 | A1 * | 4/2003 | Hearn | ................. | G06F 21/10 713/150 |
| 2004/0086124 | A1 * | 5/2004 | Sasaki | ................. | H04L 9/0833 380/277 |
| 2005/0172154 | A1 * | 8/2005 | Short | ................. | H04M 3/42017 726/5 |
| 2007/0033397 | A1 * | 2/2007 | Phillips, II | ................. | H04L 9/0866 713/168 |
| 2008/0059787 | A1 * | 3/2008 | Hohenberger | ................. | H04L 9/3013 713/153 |
| 2008/0310623 | A1 * | 12/2008 | Phillips, II | ................. | H04L 9/0866 380/29 |
| 2011/0058673 | A1 * | 3/2011 | Zheng | ................. | H04L 9/0833 380/255 |
| 2011/0154031 | A1 * | 6/2011 | Banerjee | ................. | G06F 21/6218 713/165 |
| 2011/0246774 | A1 * | 10/2011 | Phillips, II | ................. | H04L 63/0442 713/168 |
| 2012/0328105 | A1 * | 12/2012 | Mukkara | ................. | H04L 9/0897 380/277 |
| 2012/0331283 | A1 * | 12/2012 | Chandran | ................. | H04L 9/088 713/150 |
| 2013/0007464 | A1 * | 1/2013 | Madden | ................. | H04L 63/061 713/179 |
| 2013/0079120 | A1 | 3/2013 | Walker et al. | | |
| 2013/0159701 | A1 * | 6/2013 | Phillips, II | ................. | H04L 9/0866 713/155 |
| 2014/0006773 | A1 * | 1/2014 | Chazalet | ................. | H04L 63/0464 713/150 |
| 2015/0067330 | A1 * | 3/2015 | Khan | ................. | H04L 63/0428 713/168 |
| 2015/0082028 | A1 * | 3/2015 | Phillips, II | ................. | H04L 63/0807 713/161 |
| 2015/0169892 | A1 * | 6/2015 | Nord | ................. | G06F 21/6218 726/9 |
| 2015/0215120 | A1 * | 7/2015 | Bursell | ................. | G06F 21/6218 713/193 |
| 2016/0021109 | A1 * | 1/2016 | Jueneman | ................. | H04L 9/3226 713/165 |
| 2016/0119292 | A1 * | 4/2016 | Kaseda | ................. | H04L 9/14 713/165 |
| 2016/0253515 | A1 | 9/2016 | Damgard et al. | | |

OTHER PUBLICATIONS

Wu, X. et al, "Poster: a certificateless proxy re-encryption scheme for cloud-based data sharing", CCS'11, Huawei American Research Center, Chicago, Illinois, pp. 869-871, (Oct. 2011).

* cited by examiner

SYSTEM AND A METHOD FOR MANAGEMENT OF CONFIDENTIAL DATA

CROSS REFERENCE TO RELATED APPLICATIONS

In accordance with 37 C.F.R. 1.76, a claim of priority is included in an Application Data Sheet filed concurrently herewith. Accordingly, the present invention claims priority as a continuation of U.S. patent application Ser. No. 15/030,906, entitled "A SYSTEM AND A METHOD FOR MANAGEMENT OF CONFIDENTIAL DATA", filed Apr. 21, 2016, which is a § 371 national stage entry of International Application No. PCT/EP2014/072491, entitled "A SYSTEM AND A METHOD FOR MANAGEMENT OF CONFIDENTIAL DATA", filed Oct. 21, 2014, which claims the benefit of the priority of European Patent Application No. 13190481.5, entitled "A SYSTEM AND A METHOD FOR MANAGEMENT OF CONFIDENTIAL DATA", filed Oct. 28, 2013, the entire contents of each are incorporated herein by reference.

FIELD OF THE INVENTION

The present invention relates to a system and a method for managing confidential data in a cloud service in a secure manner, i.e. in a manner which to the greatest possible extent guarantees the confidentiality of the data.

BACKGROUND OF THE INVENTION

It is sometimes desirable to store data files, or to provide other kinds of data, remotely from a local system or a closed local environment, e.g. in order to be able to access the data from various location and/or using various devices, and/or in order to be able to share the data among two or more users. To this end cloud services, such as Dropbox®, Google® Drive, SkyDrive®, Amazon® S3, salesforce.com, etc. are sometimes used. A user can provide data to the cloud service, and subsequently he or she may grant access to the data for another user. Thereby the two users can share the data in an easy manner, and only users who have been granted access can access the data. The cloud service may be of a kind where data files can be stored. Alternatively, the cloud service may be of a kind which conveys data from one site to another. Common to these cloud services is that they are untrusted services which are arranged in the cloud.

One problem with the traditional cloud services is that users must trust that the data that they store in the cloud service remains confidential, e.g., that the data stored in the cloud service is not misused due to the cloud service being compromised by hackers, due to corrupted cloud service administrators, or due to legal enforcements in the country where the cloud service is hosted. In other words, the cloud service constitutes a single point of trust with respect to data confidentiality. In order to avoid this, some previous systems have applied encryption of the data, thereby requiring that encryption/decryption keys are shared between the users who are granted access to the data. However, in these previous systems the encryption/decryption keys will be permanently available somewhere in the system, either at one or more client devices or at a central key management service, thereby constituting a single point of trust. Thereby there is a risk that a malicious attack is performed on the single point of trust, thereby gaining access to the encryption/decryption keys. This will allow the malicious party to gain access to the confidential data.

EP 2 503 480 A1 discloses a method and a device for retrieving data available on a second device by a first device. During encryption of data, a client creates a random session key and encrypts the data using the random session key. The random session key is then encrypted, using a public encryption key. The encrypted data is stored along with the encrypted random session key at a second device, e.g. a cloud service. During decryption of data, the client requests the encrypted data, and the second device sends the encrypted data and the encrypted random session key to the client. The encrypted random session key is then transmitted to a plurality of partial decryption devices for performing partial decryption of the encrypted random session key, based on a respective private key stored in each of the partial decryption servers. The respective partial decryptions of the random session key are received at the client device, and the client device derives the random session key from the partial decryptions. Finally, the data is decrypted, using the derived random session key.

The private keys used for performing the partial decryption of the encrypted random session key are generated by a central key generator and subsequently distributed to the partial decryption devices. Accordingly, the central key generator constitutes a single point of trust, which may potentially be attacked, leading to a breach of confidentiality.

Furthermore, in the method and device disclosed in EP 2 503 480 A1 two layers of encryption are required in order to obtain a sufficient level of confidentiality, i.e. encrypting the data, using the random session key, and encrypting the random session key, using a public encryption key.

DESCRIPTION OF THE INVENTION

It is an object of embodiments of the invention to provide a system for management of confidential data, where the confidentiality of the data is improved as compared to prior art systems.

It is a further object of embodiments of the invention to provide a method for managing confidential data, in which the confidentiality of the data is improved as compared to prior art managing methods.

According to a first aspect the invention provides a system for management of confidential data, the system comprising:
  a cloud service for holding encrypted data,
  a cryptographic key service comprising two or more cryptographic key servers, $S_i$, each cryptographic key server, $S_i$, being arranged to generate one or more cryptographic key(s), $K_j$, and to compute one or more file encryption key(s), $k_j$, on the basis of information regarding data to be encrypted or decrypted, and using the cryptographic key(s), $K_j$, the cryptographic key(s), $K_j$, and the file encryption key(s), $k_j$, thereby being created at the cryptographic key servers, $S_i$, and
  one or more client devices, each client device being arranged to communicate with the cloud service and/or with the cryptographic key service in order to obtain encryption and/or decryption of data, and in order to provide encrypted data to the cloud service and/or retrieve decrypted data from the cloud service, using two or more file encryption keys, $k_j$, computed by the cryptographic key servers, $S_i$.

The system according to the first aspect of the invention comprises a cloud service, a cryptographic key service and one or more client devices.

The cloud service is an untrusted service, which is arranged in the cloud, i.e. it is accessible, via a data network connection, such as the Internet or a LAN connection, from any location and using any suitable device. The cloud service could be a storage service in which data files can be stored. Alternatively, the cloud service could be able to store data, e.g. in the form of records in a database or fields in a record of a database. As another alternative, the cloud service could be able to convey data between sites, devices or users. In the latter case the cloud service simply ensures that the relevant data reaches an intended final destination, but does not as such possess the data or information being provided from one user or site to another. For instance, the cloud service could be Infrastructure-as-a-Service (IaaS), Platform-as-a-Service (PaaS), or Software-as-a-Service (SaaS). Thus, the data being held by the cloud storage could, e.g., be data files, records in a database, fields in records of a database, information being conveyed between users, etc. The cloud service could be a third party service, with respect to a company using the system of the present invention, and/or with respect to a company administering the cryptographic key service.

In the case that the cloud service is Infrastructure-as-a-service (IaaS) or Platform-as-a-Service (PaaS), the system of the invention could typically be integrated directly into the service. An example could be a company offering a storage service with client-side encrypted files, or an auction system where users must submit encrypted bids.

In the case that the cloud service is Software-as-a-Service (SaaS), the system of the invention could typically be integrated into the service via techniques, such as tokenization or format-preserving encryption. In this case the system of the invention may be regarded as an add-on to an existing cloud service.

The cryptographic key service comprises two or more cryptographic key servers, $S_i$. Each of the cryptographic key servers, $S_i$, is arranged to generate one or more cryptographic keys, $K_j$. Thus, the cryptographic key service is capable of generating at least two cryptographic keys, $K_j$, and at least two of the cryptographic keys, $K_j$, are arranged on different cryptographic key servers, $S_i$, i.e. none of the cryptographic key servers, $S_i$, will possess knowledge of all the cryptographic keys, $K_j$. Thereby none of the cryptographic servers, $S_i$, constitutes a single point of trust.

In the present context the term 'server' should be interpreted to cover a single device as well as two or more individual devices being interlinked in such a manner that they, to a user accessing the server, seem to act as a single device.

It is not ruled out, that the cryptographic key service comprises further servers, which are either not capable of generating cryptographic keys, or which do not generate cryptographic keys, even if being capable of doing so. This will be described further below. For instance, the cryptographic service may comprise one or more servers which are not directly involved with the key management described here, but which are instead used for other purposes e.g. management servers.

The cryptographic key servers, $S_i$, are further arranged to compute one or more file encryption keys, $k_j$, on the basis of information regarding data to be encrypted or decrypted, and using the cryptographic key(s), $K_j$. The information regarding the data could, e.g., be or comprise suitable metadata relating to the data, for instance a file name and/or a unique identification number. Thus, the computed file encryption keys, $k_j$, are specific for the data being encrypted or decrypted. Furthermore, the two or more file encryption keys, which are computed by the cryptographic key servers, $S_i$, are each computed using a specific cryptographic key, $K_j$.

Accordingly, the file encryption keys, $k_j$, represent information which is only available to some of the cryptographic key servers, $S_i$, possibly only to a single cryptographic key server, $S_i$. Thus, none of the cryptographic key servers, $S_i$, will possess information regarding all of the computed file encryption keys, $k_j$, i.e. the information regarding the file encryption keys, $k_j$, is distributed among the cryptographic key servers, $S_i$, in a 'secret shared' manner. Accordingly, no single cryptographic key server is capable of recombining the file keys, $k_j$, into a complete file key, k, and hence no single point of trust exists.

The cryptographic keys may be keys for a symmetric encryption scheme, i.e. the encryption key may be identical to the decryption key. A symmetric encryption scheme, E, consists of two algorithms, Enc and Dec, for encryption and decryption, respectively. Enc takes as input a key, k, and some plaintext data, D, and outputs a ciphertext C. This is written as $C=Enc_k(D)$. Anyone knowing the key, k, and the ciphertext, C, can later decrypt the ciphertext in order to retrieve the plaintext, written as $D=Dec_k(C)$. Intuitively, security of the encryption scheme E means that given only a ciphertext C, an adversary cannot learn anything about the corresponding plaintext data D. According to best practice this security property should hold also when the adversary knows E. That is, even if the adversary knows the algorithm that is used to encrypt and decrypt, he should still not be able to decrypt without knowing the secret key k. This is sometimes referred to as "Kerchoff's Principle".

Given only a ciphertext, C, the adversary can always try to guess the secret key, k. That is, the adversary could make a guess k', then run the algorithm $Dec_{k'}(C)$ and see whether the output of this makes sense. If so, it knows that k' is the right key. This is sometimes referred to as a "brute force attack". In order to prevent such "brute force attacks", the key, k, must have a certain length.

The only known attack on state-of-the-art symmetric encryption schemes is (essentially) the "brute force attack". In addition, experts in the field find it unlikely that this will change anytime soon. A consequence of this is that it is sufficient to use keys of length 256 bit. This, together with other factors, e.g., that procedures for doing symmetric encryption and decryption are built into the hardware on modern CPUs, means that symmetric encryption and decryption is really fast and is likely to remain fast, also in the future. This is an advantage of symmetric encryption.

A special kind of symmetric encryption scheme is a so-called "stream cipher". A stream cipher works by expanding the key, k, to a long (pseudo-) random bit stream, R, which is xor'ed onto the plaintext in order to obtain the ciphertext. I.e., C=D xor R. The expanded key stream, R, is said to 'hide' the plaintext. Decryption works by again expanding the key to the same long random bit stream, R, which is then xor'ed to the ciphertext in order to obtain the plaintext. This works because D=C xor R=(D xor R) xor R=D xor (R xor R)=D. An embodiment of the present invention may be based on the use of a stream cipher, where the cryptographic key, K, is split into key shares, s.t. $K=K_1$ xor $K_2$ xor $K_3$, and where the key shares, $\{K_j\}$, for j=1, 2, 3, are distributed among a number of key servers.

As an alternative, the cryptographic keys could be asymmetric keys, i.e. keys used in a public-key encryption scheme where the decryption key required for decrypting data may differ from the encryption key which was used for encrypting the data.

A public-key encryption scheme F consists of two algorithms Enc and Dec, for encryption and decryption. However, contrary to the symmetric encryption scheme described above, there are two different keys. A public key, pk, and a private key, sk. Given some plaintext data and the public key, pk, a ciphertext, C, can be computed, written as $C=Enc_{pk}(D)$. Given the ciphertext, C, and the private key, sk, the plaintext can be restored, written as $D=Dec_{sk}(C)$. Security is defined more or less as for symmetric encryption: Given the ciphertext, C, (and knowledge of which algorithms are used), an adversary should not be able to learn anything about the plaintext D. Only given the private key, sk, one can recover the plaintext.

The public-key encryption schemes that are known today are rather complex compared to symmetric encryption schemes. In addition there are several known attacks on the public-key encryption schemes that are more efficient than the "brute force attack". This means that the keys need to be longer in order to obtain a reasonable level of security. For example, an RSA key typically needs to be 2048 bit today. In addition, it is viewed as very likely that more specialized attacks will be discovered, meaning that key sizes have to be further increased. This, together with the more complex nature of the public-key encryption schemes means that public-key encryption schemes are much slower than symmetric encryption schemes.

One way of improving the performance of asymmetric or public-key encryption schemes is referred to as "enveloping", in which two layers of encryption are applied. Suppose D is a long plaintext message. Then first a symmetric key, k, is chosen and $C=Enc_k(D)$ is computed using a symmetric encryption scheme. Then, $Enc_{pk}(k)$ is computed using a public encryption scheme. This reduces the amount of data that must be encrypted using the slow public-key encryption scheme. In particular, only a 256-bit key, k, needs to be encrypted using public-key encryption while the long plaintext is encrypted using the symmetric encryption scheme.

A key service that uses only symmetric encryption, and does not rely on public-key encryption, has an advantage compared to a system that involves the use of a public-key encryption scheme. Using only symmetric encryption allows for a key service that can deliver file encryption keys very quickly and that can handle a large amount of concurrent key requests. In addition, a key service based only on symmetric encryption is expected to remain fast in the foreseeable future, whereas solutions using public-key encryption are more likely to become inefficient in the future due to new attacks on public-key schemes that in turn implies a need for longer keys.

Each of the client devices is arranged to communicate with the cloud service and/or with the cryptographic key service in order to obtain encryption and/or decryption of data. Furthermore, the communication between the client devices and/or the cryptographic key service allows encrypted data to be provided to and/or retrieved from the cloud service. The providing and/or retrieving of the data to/from the cloud service may include direct communication between a client device and the cloud service. As an alternative, a client device may provide and/or retrieve data to/from the cloud service via the cryptographic key service. This will be described in further detail below.

The encryption and/or decryption of data which is obtained during the communication between a client device and the cloud service and/or the cryptographic key service, is performed using two or more file encryption keys, $k_j$, computed by the cryptographic key servers, $S_i$. Thus, the encryption and/or decryption is performed using two or more encryption key parts, which have been computed by different cryptographic key servers, $S_i$, and which are unique for the data being encrypted or decrypted, since the file encryption keys, $k_j$, are computed on the basis of information regarding the data. Thereby no single party will, on a permanent basis, possess knowledge regarding the entire file encryption key, k, used for encrypting or decrypting the data. In particular, no single party at the cryptographic key service will possess knowledge of the entire file encryption key, k, at any time. Instead the individual cryptographic key server, $S_i$, possesses knowledge of a small part of the entire encryption key, corresponding to the file encryption key(s), $k_j$, which that particular server has computed. Accordingly, no single party or individual cryptographic key server will be able to learn any information about the entire file encryption key, k, because it does not possess all parts of the key. Thus, the trust is distributed among the cryptographic key servers, $S_i$, and the cryptographic key service avoids a single point of attack. Accordingly, the system according to the first aspect of the invention provides improved confidentiality for the data being held by the cloud service, as compared to prior art systems.

Thus, a cryptographically secure, easy-to-use, cloud based key management system has been provided, in the form of a Key-Management-as-a-Service (KMaaS) system or service.

The cryptographic key servers, $S_i$, may be arranged to communicate with each other in order to share at least some of the cryptographic keys, $K_j$, among some of the cryptographic key servers, $S_i$. According to this embodiment, at least some of the cryptographic keys, $K_j$, may be known to two or more of the cryptographic key servers, $S_i$. However, none of the cryptographic key servers, $S_i$, possesses knowledge of all of the cryptographic keys, $K_j$, and thereby the distributed trust among the cryptographic key servers, $S_i$, is still provided.

Sharing some of the cryptographic keys, $K_j$, among some of the cryptographic key servers, $S_i$, allows the entire file encryption key, k, to be computed using only a subset of the cryptographic key servers, $S_i$. Thus, in the case that one or more of the cryptographic key servers, $S_i$, is unavailable, it is still possible to compute the required file encryption keys, $k_j$, and the system is operational. This makes the system less vulnerable to server malfunction, malicious attacks to some of the servers, heavy loads on some of the servers, etc. It further allows load distribution among the cryptographic key servers, $S_i$, thereby making the system operate more efficiently, and improving responsiveness.

Unavailability of a cryptographic key server, $S_i$, could e.g. be caused by hardware malfunction, software malfunction, failure to contact the server, the server being compromised due to a malicious attack, heavy loads on the server, etc.

The number of cryptographic keys, $K_j$, may be larger than the number of cryptographic key servers, $S_i$. According to this embodiment, at least some of the cryptographic key servers, $S_i$, possess knowledge of two or more cryptographic keys, $K_j$, and will thereby be capable of computing the corresponding file encryption keys, $k_j$.

The cryptographic keys, $K_j$, may be distributed among the cryptographic key servers, $S_i$, in a manner which ensures that any subset of the cryptographic key servers, $S_i$, comprising more than a specific number, T, of cryptographic key servers, $S_i$, will be able to compute all of the required file encryption keys, $k_j$, using the cryptographic keys, $K_j$, which they know among them. Simultaneously, any subset of the cryptographic key servers, $S_i$, comprising T or less cryptographic key servers, $S_i$, will not be able to compute all of the required file encryption keys, $k_j$, even if they use all of the cryptographic keys, $K_j$, which they know among them. If the number of cryptographic key servers, $S_i$, is n, then T<n. A subset of $T_x1$ cryptographic key servers, $S_i$, could be designated a 'minimally qualified subset', since it represents the lowest number of cryptographic key servers, $S_i$, required for generating the necessary file encryption keys, $k_j$.

The system may further comprise an access control service arranged to control access to data held by the cloud service, for users requesting access to data via a client device. The access control service may, e.g., control access to the file encryption keys, $k_j$, required for decrypting requested data. According to this embodiment, users wanting to access data held by the cloud service must initially contact the access control service. The access control service keeps track of which users are allowed to access which data. Furthermore, the access control service may keep track of which users are entitled to perform which actions with respect to the data, e.g., reading files, editing files, storing new files, receiving information via the cloud service, accessing a record in a database, etc. The access control service, thus, performs an authentication process, preferably followed by an authorization process, and the outcome of the authentication/authorization process determines whether or not the request for accessing the data is granted.

The access control service may form part of the cryptographic key service. As an alternative, the access control service may be a separate service.

Each client device may be arranged to perform encryption and/or decryption of data, using two or more file encryption keys, $k_j$, received from the cryptographic key servers, $S_i$. According to this embodiment, encryption and/or decryption takes place at the client device. As an alternative, the encryption and/or decryption may take place at the cryptographic key service. This will be described in further detail below.

According to a second aspect the invention provides a method for managing confidential data in a cloud service, the method comprising the steps of:
  a user contacting a cryptographic key service, via a client device, the cryptographic key service comprising two or more cryptographic key servers, $S_i$,
  the user providing information to the cryptographic key service, regarding data to be encrypted or decrypted,
  at least two of the cryptographic key servers, $S_i$, each computing one or more file encryption key(s), $k_j$, based on the information regarding the data, and using one or more cryptographic key(s), $K_j$, which has/have previously been generated by the cryptographic key service, the cryptographic key(s), $K_j$, and the file encryption key(s), $k_j$, thereby being created at the cryptographic key servers, $S_i$,
  in the case that the data is to be encrypted, encrypting the data, using at least some of the file encryption keys, $k_j$, computed by the cryptographic key servers, $S_i$, and providing the encrypted data to the cloud service, and
  in the case that the data is to be decrypted, retrieving the data from the cloud service, and decrypting the data, using at least some of the file encryption keys, $k_j$, computed by the cryptographic key servers, $S_i$.

It should be noted that a person skilled in the art would readily recognise that any feature described in combination with the first aspect of the invention could also be combined with the second aspect of the invention, and vice versa. Thus, the method according to the second aspect of the invention may advantageously be performed using a system according to the first aspect of the invention. The remarks set forth above are therefore equally applicable here.

According to the method of the second aspect of the invention, a user initially contacts a cryptographic key service, via a client device. The cryptographic key service comprises two or more cryptographic key servers, $S_i$, as described above with reference to the first aspect of the invention.

The user then provides information to the cryptographic key service, regarding data to be encrypted or decrypted. The provided information may, e.g., be or comprise relevant metadata of the data, such as a unique data ID, length of a data file, etc.

Next, at least two of the cryptographic key servers, $S_i$, each computes one or more file encryption key(s), $k_j$, based on the received information regarding the data, and each using one or more cryptographic key(s), $K_j$. The cryptographic keys, $K_j$, have previously been generated by the cryptographic key service. A given cryptographic key, $K_j$, may, e.g., be generated by the cryptographic key server, $S_i$, which subsequently uses the cryptographic key, for generating a file encryption key, $k_j$. As an alternative, the cryptographic key, $K_j$, may be generated by one of the other cryptographic key servers, $S_i$ and subsequently shared with the cryptographic key server, $S_i$, which uses it for generating a file encryption key, $k_j$.

Since at least two of the cryptographic key servers, $S_i$, each generates one or more file encryption key(s), $k_j$ none of the cryptographic key servers, $S_i$, possesses knowledge of all of the generated file encryption keys, $k_j$. Accordingly, no single cryptographic key server must be trusted, and thereby no single point of attack exists at the cryptographic key service, as described above with reference to the first aspect of the invention.

In the case that the data is to be encrypted, the data is then encrypted, using at least some of the file encryption keys, $k_j$, which were computed by the cryptographic key servers, $S_i$. Finally, the encrypted data is provided to the cloud service.

Similarly, in the case that the data is to be decrypted, the encrypted data is retrieved from the cloud service. Then the retrieved data is decrypted, using at least some of the file encryption keys, $k_j$, which were computed by the cryptographic key servers, $S_i$.

It should be noted that the step of retrieving the encrypted data could be performed prior to or simultaneously with the steps of the user contacting the cryptographic key service, and the cryptographic key servers, $S_i$, computing the file encryption keys, $k_j$.

Thus, the encryption or decryption is performed using file encryption keys, $k_j$, which were computed by at least two different cryptographic key servers, $S_i$. Accordingly, the method according to the second aspect of the invention provides improved confidentiality for the data being held by the cloud service, as compared to prior art methods.

The method may further comprise the steps of:
  the user contacting an access control service in order to gain access to data in the cloud service, and
  the access control service granting or denying access to the requested data based on previously provided access information data.

According to this embodiment, an access control service is provided. As described above, the access control service may form part of the cryptographic key service, or it may be a separate entity.

In this case, when a user wishes to gain access to data in the cloud service, he or she initially contacts the access control service. The user may advantageously contact the access control service via a client device. In response to this contact, the access control service investigates whether or not the user is authorized to perform the requested actions. This may include an authentication and authorization process. In order to determine whether or not the user is authorized to perform the requested actions, the access control service consults access information data, which has previously been provided to the access control service, e.g. in the form of a look-up table listing which users are authorized to perform which actions. The access information data may be dynamical in the sense that it may be updated during the lifetime of the system, in order to revoke access authorisations which are no longer valid, to add access authorisation for new users, or to update access authorisations for existing users.

The access information may be simple in the sense that it either grants or denies a given user access to data in the cloud service. As an alternative, the access information may specify which data a given user is authorised to access. Furthermore, the access information may specify which kinds of actions a given user is authorised to perform with respect to which data. For instance, some users may only be authorised to read the contents of one or more data files, while other users may further be authorised to edit one or more data files and/or to provide new data to the cloud service, e.g. storing new data files in the cloud service.

Based on the access information data, the access control service either grants of denies the requested access.

The method may further comprise the steps of:
a user granting access permission to data in the cloud service for another user, and communicating this to the access control service, and
the access control service updating the access information data in accordance with the granted access permission.

According to this embodiment, one user may be authorised to allow another user to access data in the cloud storage service. For instance, the user granting the access permission may be an author of one or more of the data files, and the user being granted the access permission may be a person, with whom the author wishes to share the contents of the data file(s). The access permission may be time limited and/or it may be limited to specific actions. As an alternative, the user granting the access permission may be an administrator.

In any event, the user granting the access permission communicates this to the access control service, and in response thereto, the access control service updates the access information data to reflect that access permission has been granted to the user in question. When this user subsequently contacts the access control service in order to gain access to data in the cloud service, the access control service will grant the access to the relevant data, and with respect to the relevant actions.

The method may further comprise the step of at least some of the cryptographic key servers, $S_i$, sharing a generated cryptographic key, $K_j$, with some of the other cryptographic key servers, $S_j$.

According to this embodiment, at least some of the cryptographic keys, $K_j$, may be known to two or more of the cryptographic key servers, $S_i$. However, none of the cryptographic key servers, $S_i$, possesses knowledge of all of the cryptographic keys, $K_j$, and thereby the distributed trust among the cryptographic key servers, $S_i$, is still provided.

As described above with reference to the first aspect of the invention, sharing some of the cryptographic keys, $K_j$, among some of the cryptographic key servers, $S_i$, allows the entire encryption key to be computed using only a subset of the cryptographic key servers, $S_i$. Thus, in the case that one or more of the cryptographic key servers, $S_i$, is unavailable, it is still possible to compute the required file encryption keys, $k_j$, and the system is operational, thereby making the method less vulnerable to server malfunction, malicious attacks to some of the servers, heavy loads on some of the servers, etc.

The number of cryptographic keys, $K_j$, may be larger than the number of cryptographic key servers, $S_i$. According to this embodiment, at least some of the cryptographic key servers, $S_i$, possess knowledge of two or more cryptographic keys, $K_j$, and will thereby be capable of computing the corresponding file encryption keys, $k_j$.

All of the cryptographic key servers, $S_i$, may be capable of generating one or more cryptographic keys, $K_j$. As an alternative, some of the cryptographic key servers, $S_i$, may possess only cryptographic keys, $K_j$, which were generated by other cryptographic key servers, $S_i$, and subsequently shared with the cryptographic key server, $S_i$.

As an example, the cryptographic key service may comprise three cryptographic key servers, $S_1$, $S_2$, and $S_3$. Assuming that the cryptographic keys, $K_j$, are shared among the cryptographic key servers, $S_1$, $S_2$, and $S_3$, in such a manner that any subset of two of the cryptographic key servers, $S_1$, $S_2$, and $S_3$, are capable of providing a required number of cryptographic keys, $K_j$, three minimally qualified subsets exist, i.e. $Q_1=\{S_1, S_2\}$, $Q_2=\{S_1, S_3\}$, and $Q_3=\{S_2, S_3\}$. For each of the minimally qualified subsets, one of the cryptographic key servers, $S_i$, designated the representative for the subset, generates a cryptographic key, $K_j$, and shares the generated cryptographic key, $K_j$, with the other cryptographic key servers, $S_i$, of the subset. According to the present example, $S_1$ may be the representative for $Q_1$, $S_3$ may be the representative for $Q_2$ and $Q_3$, and $S_2$ may not be a representative for a subset at all. In this case, $S_1$ generates $K_{Q1}$, and shares it with $S_2$. $S_3$ generates $K_{Q2}$, and shares it with $S_1$, and generates $K_{Q3}$, and shares it with $S_2$.

Thereby $S_1$ possesses knowledge of $K_{Q1}$ and $K_{Q2}$, $S_2$ possesses knowledge of $K_{Q1}$ and $K_{Q3}$, and $S_3$ possesses knowledge of $K_{Q2}$ and $K_{Q3}$. Accordingly, none of the cryptographic key servers, $S_1$, $S_2$, and $S_3$, possesses knowledge of all three cryptographic keys, $K_{Q1}$, $K_{Q2}$ and $K_{Q3}$. But any combination of two of the cryptographic key servers, $S_1$, $S_2$, and $S_3$, i.e. any of the minimally qualified subsets, $Q_1$, $Q_2$ and $Q_3$, possesses knowledge of all three cryptographic keys, $K_{Q1}$, $K_{Q2}$ and $K_{Q3}$. Therefore any one of the cryptographic key servers, $S_1$, $S_2$ or $S_3$, can be dispensed with, but none of the cryptographic key servers, $S_1$, $S_2$, and $S_3$, constitute a single point of trust, and thereby a single point of attack.

Consider another example with five servers, $S_1$, $S_2$, $S_3$, $S_4$, $S_5$, and threshold T=2: This gives rise to 10 minimally qualified subsets: $Q_1=\{S_1, S_2, S_3\}$, $Q_2=\{S_1, S_2, S_4\}$, $Q_3=\{S_1, S_2, S_5\}$, $Q_4=\{S_1, S_3, S_4\}$, $Q_5=\{S_1, S_3, S_5\}$, $Q_6=\{S_1, S_4, S_5\}$, $Q_7=\{S_2, S_3, S_4\}$, $Q_8=\{S_2, S_3, S_5\}$, $Q_9=\{S_2, S_4, S_5\}$, and $Q_{10}=\{S_3, S_4, S_5\}$. Say, for example, that the server with the lowest index in each subset is the representative for that subset. The representative server for each subset $Q_k$ (for k=1, 2, . . . , 10) initially generates a key $K_{Qk}$ for that subset and distributes that key to each of the other servers in that subset. As a consequence, any subset of two or less servers will miss at least one key while on the other hand any subset of 3 or more servers will indeed together possess all the keys.

The method may further comprise the steps of:
in the case that the data is to be encrypted, performing the step of encrypting the data at the client device, and the user providing the encrypted data to the cloud service, via the client device, and
in the case that the data is to be decrypted, the user retrieving an encrypted data from the cloud service, via the client device, and performing the step of decrypting the data at the client device.

According to this embodiment, the encryption or decryption takes place at the client device, based on file encryption keys, $k_j$, received from the cryptographic key service. This may be referred to as a direct mode.

In the case that the data is to be encrypted, this may take place in the following manner. The user sends a request to the cryptographic key service, via the client device, the request including required information regarding the data. Based on the received information, and using the cryptographic keys, $K_j$, the cryptographic key servers, $S_i$, compute the file encryption keys, $k_j$, as described above. The computed file encryption keys, $k_j$, are returned to the client device. Once the client device has received all of the file encryption keys, $k_j$, the client device expands each of these to a bit stream, and then xor's these streams (i.e. combines the bit streams into one resulting bit stream using the bitwise exclusive- or operation of the bits in the streams). This results in one bit stream which is used for encrypting the data. Finally, the client device provides the encrypted data to the cloud device.

Similarly, in the case that the data is to be decrypted, this may take place in the following manner. The user sends a request to the cryptographic key service, via the client device, the request including required information regarding the data. Based on the received information, and using the cryptographic keys, $K_j$, the cryptographic key servers, $S_i$, compute the file encryption keys, $k_j$, as described above. The computed file encryption keys, $k_j$, are returned to the client device. Once the client device has received all of the file encryption keys, $k_j$, the client device expands each of these to a bit stream. The client device then retrieves the encrypted data from the cloud service, and decrypts the data, by xor'ing the expanded bit stream to the encrypted data. As an alternative, the encrypted data may be retrieved from the cloud service prior to or concurrently with obtaining the file encryption keys, $k_j$, from the cryptographic key service.

As an alternative to performing the encryption or decryption at the client device, the method may further comprise the steps of:

in the case that the data is to be encrypted, the step of encrypting the data is performed in a distributed manner at least partly at the cryptographic key service, and the cryptographic key service providing the encrypted data to the cloud service, and in the case that the data is to be decrypted, the cryptographic key service retrieving encrypted data from the cloud service, and performing the step of decrypting the data at least partly at the cryptographic key service, in a distributed manner.

According to this embodiment, at least part of the encryption or decryption takes place at the cryptographic key service, i.e. the computed file encryption keys, $k_j$, never leave the cryptographic key service. This may be referred to as a proxy mode.

In the case that the data is to be encrypted, this may take place in the following manner. The user splits the data into a number of random bit streams, and provides one bit stream to each of the cryptographic key servers, $S_i$, of the cryptographic key service, via the client device. Furthermore, the user provides required information regarding the data to each of the cryptographic key servers, $S_i$, along with the bit streams. Based on the received information, each of the cryptographic key servers, $S_i$, computes file encryption keys, $k_j$, using the cryptographic keys, $K_j$, as described above. Based on the file encryption keys each cryptographic key server, $S_i$, then computes a bit stream, $e_i$. The computed bit streams, $e_i$, are all provided to one of the cryptographic key servers, for example $S_1$. $S_1$ then completes the encryption of the data by xor'ing the received bit streams, $e_i$, and provides the encrypted data to the cloud service. It should be noted that the process described above could be performed with only some of the cryptographic key servers, $S_i$, computing the file encryption keys, $k_j$, as described above.

In the case that the data is to be decrypted, this may take place in the following manner. The user sends a request to the cryptographic key service, via the client device, the request including required information regarding the data. Based on the received information regarding the data, each of (or some of) the cryptographic key servers, $S_i$, computes file encryption keys, $k_j$, in the manner described above, and uses the file encryption keys to compute a bit stream $e_i$ that is provided to the client device. One of the cryptographic key servers, for example $S_1$, in addition retrieves the encrypted data from the cloud service and xor's it with the bit stream $e_1$ before providing it to the client device. The client device then completes the decryption of the data by computing the xor of the received bit streams.

Thus, the step of encrypting data and/or the step of decrypting data may comprise computing two or more bit streams on the basis of the computed file encryption keys, $k_j$.

The method may further comprise the steps of:

the cryptographic key service generating one or more new cryptographic key(s), $k_j'$, and reencrypting one or more encrypted data files stored in the cloud service, using the new cryptographic keys, $k_j'$.

This embodiment is particularly relevant for cloud services in which data files are stored. The reencryption takes place without any single party gaining knowledge of the contents of the data file being reencrypted. Thereby a high level of confidentiality is obtained.

The reencryption may, e.g., take place in the following manner. The cryptographic key servers, $S_i$, generate a number of bit streams, $r_i$=expansion($k_j$) xor expansion ($k_j'$). When all $r_i$'s are xor'ed onto the encrypted data, the file encryption key is refreshed from k to k'. Furthermore, as long as k remains unknown, the individual bit streams, $r_i$, provide no information regarding the data file, or regarding the new file encryption key, k'. Thus, the step of xor'ing the $r_i$ streams can be performed by any party, such as a cryptographic key server, $S_i$, the client device or a third party without violating the confidentiality.

According to this embodiment, at least some of the cryptographic keys, $K_j$, are refreshed from time to time, and the data files stored in the cloud service are reencrypted in accordance with the refreshed cryptographic keys, $K_j'$. This key refreshment may be performed as a background service while the service continues to operate in a normal manner, and/or the key refreshment may be performed while the cryptographic key servers, $S_i$, are otherwise idle. The key refreshment may be initiated by an administrator, and/or it may be automatically performed at predefined time intervals, e.g. every night or once every week, e.g. initiated by the cryptographic servers, $S_i$, themselves. The key refreshment improves the security of the system and the method, since old cryptographic keys, $K_j$, which may have been maliciously obtained by a third party, will no longer be valid once the key refreshment has taken place. This may be referred to as "proactive security".

Proactive security, as described above, protects against adversaries that—over time—manages to steal all the cryptographic key shares held by the key servers (e.g. by hacking the key servers, by bribing the key server administrators, etc.). When all key shares are refreshed regularly, an attacker must steal all the key shares within a limited time frame, otherwise the key shares are refreshed, and then the old key shares stolen so far become useless for the adversary.

Using a symmetric encryption scheme allows the reencryption described above to be performed in an easy and efficient manner. The reencryption is performed in the cloud storage device with a strong threshold security guarantee, and without any single party learning anything about the plaintext data, i.e. the un-encrypted data.

Alternatively or additionally, the method may further comprise the steps of:
- the user providing altered information to the cryptographic key service, regarding an encrypted data file stored in the cloud service,
- at least some of the cryptographic key servers, $S_i$, computing one or more new file encryption keys, $k_j'$, based on the altered information regarding the data file, and using one or more of the cryptographic keys, $K_j$,
- reencrypting the data file using at least some of the new file encryption keys, $k_j'$, and
- storing the reencrypted data in the cloud service.

This process may, e.g., be used when a user, who previously had access to one or more data files stored in the cloud service, is no longer permitted to gain access to the data file(s). In order to ensure that this user can no longer access the data file(s) in question, another user, typically the user who is the author of the data file(s), provides altered information regarding the encrypted data files, to the cryptographic key service. The process of encrypting the relevant data file(s) is then repeated as described above, but the file encryption keys, $k_j'$, are computed on the basis of the altered information regarding the data file(s).

The method may further comprise the steps of:
- the user concatenating a data file to be encrypted with some random salt, S,
- the user computing a hash, H, of the concatenation of the data file and the salt, S,
- the user splitting the hash, H, and the salt, S, into shares, and
- the user communicating the shares to the cryptographic key service.

BRIEF DESCRIPTION OF THE DRAWINGS

The invention will now be described in further detail with reference to the accompanying drawings in which.

DETAILED DESCRIPTION OF THE DRAWINGS

Figure 1:
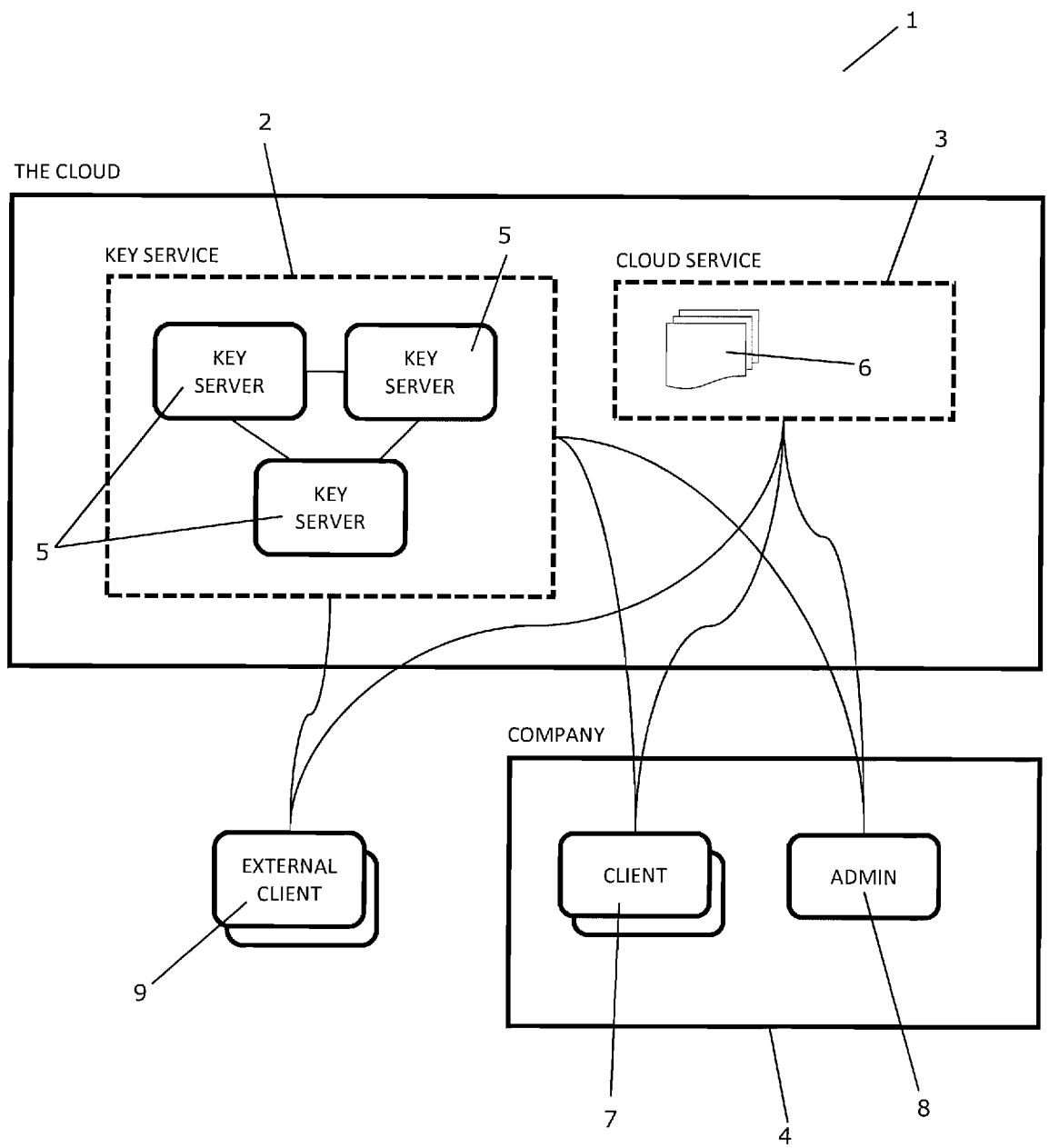
FIG. 1 is a diagrammatic view of a system according to an embodiment of the invention.

FIG. 1 is a diagrammatic view of a system 1 for management of confidential data according to an embodiment of the invention, in the form of a system for secure storage of data files. The system 1 comprises a cryptographic key service 2 and a cloud service 3. The cryptographic key service 2 and the cloud service 3 are both cloud based, i.e. they are arranged in 'the cloud', rather than being arranged at a specific server or server cluster arranged within a company 4 using the system 1.

The cryptographic key service 2 comprises a number of cryptographic key servers 5, three of which are shown. At least two of the cryptographic key servers 5 are capable of generating one or more cryptographic keys, $K_j$. Furthermore, the cryptographic key servers 5 are able to communicate with each other in order to share the generated cryptographic keys, $K_j$. However, none of the individual cryptographic key servers 5 will be in the possession of all of the cryptographic keys, $K_j$, at any time, and thereby none of the cryptographic key servers 5 forms a single point of trust, and thereby a single point of attack. On the other hand, sharing at least some of the cryptographic keys, $K_j$, among some of the cryptographic key servers 5 allows encryption and decryption of data to be performed without the participation of all of the cryptographic key servers 5.

A number of encrypted data files 6 are stored in the cloud service 3. Accordingly, the stored data files 6 are accessible from any location, via a network connection, such as the Internet or a LAN connection.

A company 4 uses the system 1. A number of client devices 7 are arranged within the company 4, typically behind a firewall of the company 4. Users may access the cryptographic key service 2 and/or the cloud service 3 via one of the client devices 7. Thereby the user is allowed to encrypt data files 6, using encryption keys obtained from the cryptographic key service 2, and to store the encrypted data files 6 in the cloud service 3. Furthermore, the user is allowed to retrieve encrypted data files 6 from the cloud service 3, and to decrypt the data files 6, using encryption keys obtained from the cryptographic key service 2. This may be done in the following manner.

In the case that a user wishes to encrypt a data file 6 and store it in the cloud service 3, the user initially contacts the cryptographic key service 2, via a client device 7, requesting encryption keys, the request including relevant information regarding the data file 6 to be encrypted, e.g. in the form of relevant metadata. In response to the request, the cryptographic key service 2 may perform an authentication and/or authorization process, by means of an access control service (not shown), in order to establish whether or not the user is authorised to store encrypted data files 6 in the cloud service 3.

If it is established that the user is authorised to store data files 6 in the cloud service 3, the cryptographic key servers 5 compute file encryption keys, $k_j$, based on the information regarding the data file 6 which was received from the user, and using the cryptographic keys, $K_j$, and provide the computed file encryption keys, $k_j$, to the user, via the client device 7. Since none of the cryptographic key servers 5 possesses knowledge of all of the cryptographic keys, $K_j$, none of the cryptographic key servers 5 will be able to compute all of the required file encryption keys, $k_j$. Accordingly, the client device 7 must receive file encryption keys, $k_j$, from at least two different cryptographic key servers 5, and possibly from more than two cryptographic key servers 5. However, since at least some of the cryptographic keys, $K_j$, are shared among some of the cryptographic key servers 5, the required number of file encryption keys, $k_j$, can be obtained without receiving file encryption keys, $k_j$, from all of the cryptographic key servers 5.

When the required number of file encryption keys, $k_j$, have been received at the client device 7, the user encrypts the data file 6, using the received file encryption keys, $k_j$.

Finally, the user stores the encrypted data file 6 in the cloud service 3, via the client device 7.

Similarly, in the case that a user wishes to decrypt a data file 6 stored in the cloud service 3, the user initially contacts the cryptographic key service 2, via a client device 7, requesting encryption keys, the request including relevant information regarding the data file 6 to be decrypted, e.g. in the form of relevant metadata, such as the file name and/or a unique number identifying the file. In response to the request, the cryptographic key service 2 may perform an authentication and/or authorization process, by means of an access control service (not shown), in order to establish whether or not the user is authorised to access the requested encrypted data files 6 in the cloud service 3. If it is established that the user is authorised to access the requested data file 6, the cryptographic key servers 5 of the cryptographic key service 2 compute file encryption keys, $k_j$, and provide these to the client device 7, in the manner described above.

When the required number of file encryption keys, $k_j$, have been received at the client device 7, the user retrieves the encrypted data file 6 from the cloud service 3, via the client device 7, and decrypts the retrieved data file 6, using the file encryption keys, $k_j$.

As an alternative, the user may retrieve the encrypted data file 6 from the cloud service 3 prior to or simultaneously with obtaining the file encryption keys, $k_j$.

It should be noted, that the cloud service 3 could, alternatively, be of a kind in which actual data files are not stored. For instance, the cloud service 3 may comprise a database, and the encrypted data may be records of the database or fields of records of the database. As an alternative, the cloud service 3 may be of a kind which conveys data or information between various sites or various users.

An administrator 8 acting from within the company 4 can access the cryptographic key service 2 and the cloud service 3. The administrator 8 may, e.g., contact the cryptographic key service 2 in order to administer access rights being controlled by an access control service forming part of the cryptographic key service 2. Furthermore, the administrator 8 may contact the cryptographic key service 2 in order to initiate key refreshment. To this end the administrator 8 contacts the cryptographic key servers 5 of the cryptographic key service 2, requesting them to generate new cryptographic keys, $K_j'$. Next, the cryptographic key service 2 reencrypts all of the data files 6 stored in the cloud service 3, using the new cryptographic keys, $K_j'$.

In the case that a user wishes to share an encrypted data file 6 stored in the cloud service 3 with another user, he or she may grant access permission with respect to the relevant data file(s) 6 to the other user. This is communicated to the access control service, if applicable. Furthermore, the first user provides information regarding the data file(s) 6 to the second user, e.g. in the form of relevant metadata. The second user is then able to obtain file encryption keys, $k_j$, from the cryptographic key service 2, to retrieve the stored data file(s) 6 from the cloud service 3, and to decrypt the retrieved data file(s) 6, using the obtained file encryption keys, $k_j$. Thereby data files 6 can be shared easily, but in a secure manner.

The second user may access the data file(s) 6 from a client device 7 arranged within the company 4. Alternatively the second user may access the data file(s) 6 from an external client device 9, i.e. a client device which is arranged outside the firewall of the company 4. In this case the second user may be an external user, i.e. somebody who is not employed by the company 4, or it may be an employee of the company 4 who is accessing the data file(s) 6 from a remote or external location.

Figure 2:
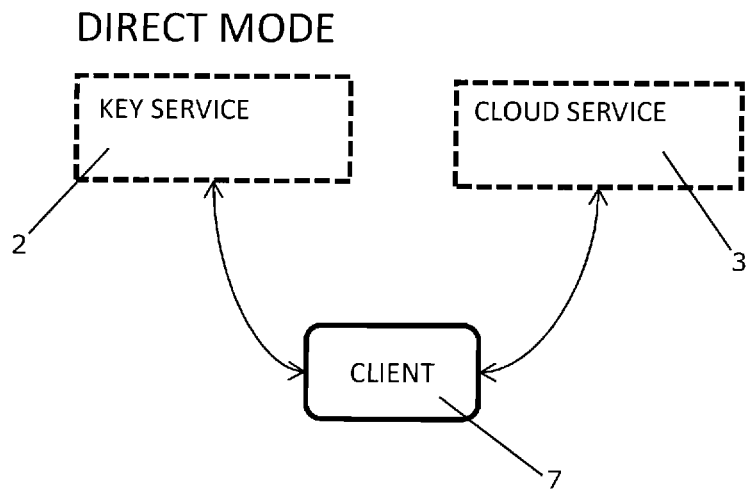
FIG. 2 illustrates communication between a client device, a cryptographic key service, and a cloud service according to a first embodiment of the invention.

FIG. 2 illustrates a method according to a first embodiment of the invention, in which a direct communication mode is applied. A client device 7 communicates directly with a cryptographic key service 2 as well as with a cloud service 3. Thus, the client device 7 requests and receives file encryption keys, $k_j$, directly from the cryptographic key service 2, and the client 7 provides and retrieves encrypted data directly to/from the cloud service 3. According to this embodiment, encryption and decryption of data takes place at the client device 7.

Figure 3:
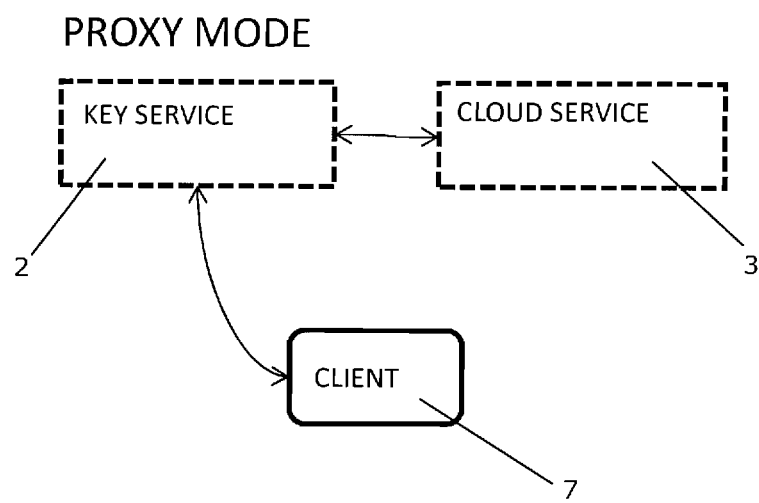
FIG. 3 illustrates communication between a client device, a cryptographic key service, and a cloud service according to a second embodiment of the invention.

FIG. 3 illustrates a method according to a second embodiment of the invention, in which a proxy communication mode is applied. In this case, the client device 7 communicates with the cryptographic key service 2, but not directly with the cloud service 3. Thus, the client device 7 is able to request the cryptographic key service 2 to compute file encryption keys, $k_j$, but is not able to directly provide encrypted data to the cloud service 3 or to directly retrieve encrypted data from the cloud service 3. Instead, when a user wishes to decrypt data, the user contacts the cryptographic key service 2, via the client device 7, providing relevant information regarding the data to the cryptographic key service 2, e.g. in the form of relevant metadata. In response to this, cryptographic key servers of the cryptographic key service 2 compute file encryption key, $k_j$, and the cryptographic key service 2 retrieves the encrypted data from the cloud service 3. The cryptographic key servers then each perform part of the decryption of the data, corresponding to the file encryption key(s), $k_j$, being in their possession. The partly decrypted data is then provided to the client device 7, where the decryption is completed, e.g. by combining bit streams received from the cryptographic key servers.

Similarly, when a user wishes to encrypt data, the user splits the data into a number of random bit streams, and provides the bit streams to various cryptographic key servers of the cryptographic key service 2, along with relevant information regarding the data file, e.g. in the form of relevant metadata. In response to this, the cryptographic key servers of the cryptographic key service 2 compute file encryption keys, $k_j$, in the manner described above, and encrypt the bit streams, using the computed file encryption keys, $k_j$. Finally, the cryptographic key servers provide the encrypted bit streams to the cloud service 3. As an alternative, one of the cryptographic key servers may collect the encrypted bit streams from the other cryptographic key servers and provide the final encryption of the data, which is the xor of all of the encrypted bit streams, to the cloud service 3.

Thus, according to this embodiment at least part of the encryption and decryption of data takes place at the cryptographic key service 2, and the computed file encryption keys, $k_j$, never leave the cryptographic key service 2.

Figure 4A:
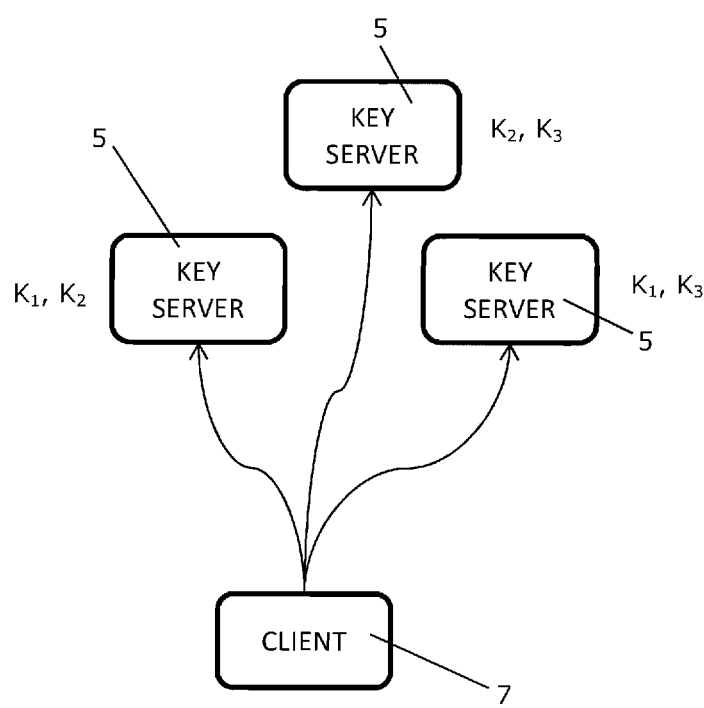
FIGS. 4a-4c illustrate various steps of a method according to an embodiment of the invention.
Figure 4B:
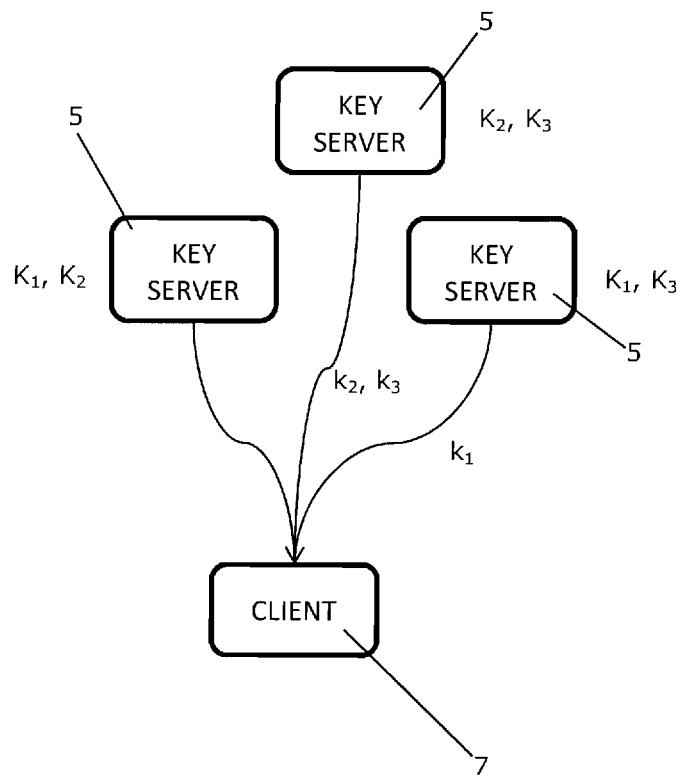
Figure 4C:
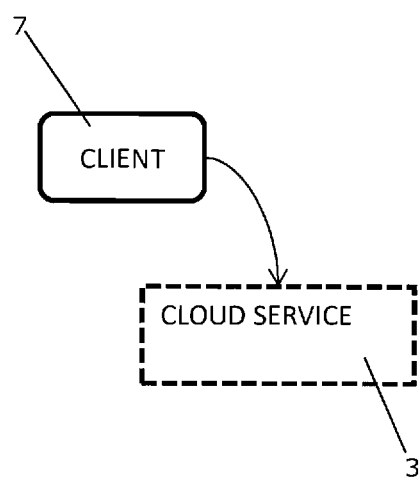

FIGS. 4a-4c illustrate a method according to an embodiment of the invention. The embodiment illustrated in FIGS. 4a-4c is an example of a direct communication mode. In FIG. 4a a client device 7 communicates with a number of cryptographic key servers 5, three of which are shown, of a cryptographic key service. The client device 7 requests encryption of data. To this end, the client device 7 provides relevant information regarding the data to the cryptographic key servers 5, e.g. metadata, such as a file identification number. In response to this, the cryptographic key servers 5 compute file encryption keys, each using one or more cryptographic keys which is/are known to the individual cryptographic key server 5, but not all of the other cryptographic key servers 5, and on the basis of the information received from the client device 7.

Each of the cryptographic key servers 5 is in the possession of two cryptographic keys, $K_j$, but none of the cryptographic key servers 5 is in the possession of all three cryptographic keys, $K_j$. Furthermore, the cryptographic keys, $K_j$, are distributed among the cryptographic key servers 5 in such a manner that a subset of any two of the cryptographic key servers 5 is in the possession of all three cryptographic keys, $K_j$. In particular, a first of the cryptographic key servers 5 is in the possession of $K_1$ and $K_2$, a second of the cryptographic key servers 5 is in the possession of $K_2$ and $K_3$, and a third of the cryptographic key servers 5 is in the possession of $K_1$ and $K_3$.

Thus, the three file encryption keys, $k_j$, which are required in order to encrypt or decrypt data, can be obtained from only two of the cryptographic key servers 5. Therefore the client device 7 may contact only two of the cryptographic key servers 5, for instance the cryptographic key server 5 being in the possession of $K_2$ and $K_3$, and the cryptographic key server 5 being in the possession of $K_1$ and $K_3$.

In FIG. 4b the cryptographic key servers 5 return the file encryption keys to the client device 7, and the client device 7 encrypts the data. More particularly, the cryptographic key server 5 being in the possession of $K_2$ and $K_3$ returns file encryption keys $k_2$ and $k_3$, the cryptographic key server 5 being in the possession of $K_1$ and $K_3$ returns file encryption key $k_1$, and the encryption key server 5 being in the possession of $K_1$ and $K_2$ does not return any file encryption keys.

Finally, as illustrated in FIG. 4c, the client device 7 provides the encrypted data to a cloud service 3.

Figure 5:
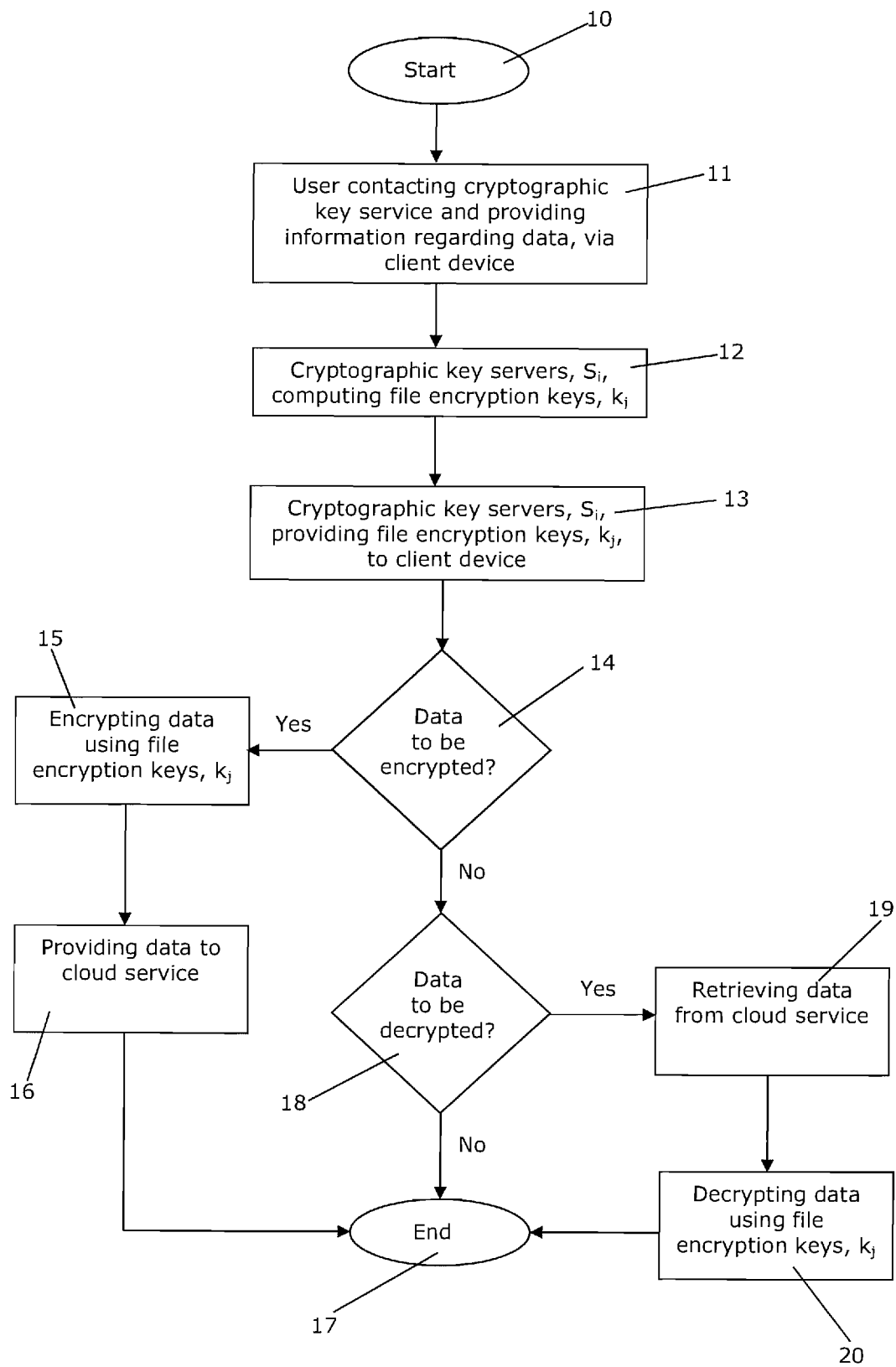
FIG. 5 is a flow diagram illustrating a method according to an embodiment of the invention.

FIG. 5 is a flow diagram illustrating a method according to an embodiment of the invention. The process is started at step 10. At step 11 a user contacts a cryptographic key service, providing information regarding data to be encrypted or decrypted to cryptographic key servers, $S_i$, of the cryptographic key service. This step is performed via a client device.

At step 12 the cryptographic key server, $S_i$, of the cryptographic key service each compute one or more file encryption keys, $k_j$, based on the information regarding the data, which was received from the user, and using cryptographic keys, $K_j$, which have previously been generated by the cryptographic key service. The cryptographic keys, $K_j$, are distributed among the cryptographic key servers, $S_i$, in such a manner that none of the cryptographic key servers, $S_i$, possesses knowledge of all of the cryptographic keys, $K_j$. Accordingly, the cryptographic keys, $K_j$, are secretly shared among the cryptographic key servers, $S_i$. The file encryption keys, $k_j$, are computed in the manner described above.

At step 13 the cryptographic key servers, $S_i$, provide the computed file encryption keys, $k_j$, to the client device.

At step 14 it is investigated whether or not the data is to be encrypted. If this is the case the process is forwarded to step 15, where the data is encrypted, using the file encryption keys, $k_j$, which were received from the cryptographic key servers, $S_i$.

At step 16 the encrypted data is provided to a cloud service before the process is ended at step 17.

In the case that step 14 reveals that the data is not to be encrypted, the process is forwarded to step 18, where it is investigated whether or not the data is to be decrypted. If this is the case, the process is forwarded to step 19, where the encrypted data is retrieved from the cloud service.

At step 20 the retrieved data is decrypted, using the file encryption keys, $k_j$, which were received from the cryptographic key servers, $S_i$, before the process is ended at step 17.

In the case that step 18 reveals that the data is not to be decrypted, the process is simply ended at step 17.

The invention claimed is:

1. A system for management of confidential data, the system comprising:
   an untrusted cloud service for storing encrypted data,
   a cryptographic key service comprising two or more hardware cryptographic key servers ($S_i$) comprising at least a first and a second cryptographic key server, wherein each of said two or more cryptographic key servers ($S_i$) independently generates one or more different cryptographic key(s) ($K_j$), wherein the first cryptographic key server ($S_i$) produces at least one cryptographic key(s) ($K_j$), not produced by any other cryptographic key servers from the two or more hardware cryptographic key servers ($S_i$) and said second cryptographic key server ($S_i$) produces at least one or more additional cryptographic key(s) ($K_j$) not produced by any other cryptographic key servers from the two or more said first cryptographic key servers ($S_i$), wherein no single cryptographic key server from the two or more cryptographic key servers ($S_i$) possesses knowledge of all cryptographic key(s) ($K_j$) generated by said cryptographic key service;
   wherein in response to receiving a request for encryption or decryption of data files from one or more client devices, the data files comprising confidential data and the request comprising information regarding the data files, each of said two or more cryptographic key servers ($S_i$) are further configured to compute one or more file encryption key(s) ($K_{F\_j}$) on the basis of the information regarding the data files, wherein the information comprises metadata identifying the data files, and each of the one or more file encryption key(s) ($K_{F\_j}$) are computed at one of the respective two or more hardware cryptographic key servers ($S_i$); wherein each of the one or more file encryption key(s) ($K_{F\_j}$) created at a specific one of the two or more cryptographic key servers ($S_i$) are required to be computed using the cryptographic key ($K_j$) generated by that specific cryptographic key server ($S_i$) and at least two different file encryption keys ($K_{F\_j}$) from the one or more file encryption key(s) ($K_{F\_j}$) computed by at least two different servers from the two or more hardware cryptographic key servers ($S_i$) are required to encrypt and decrypt said data files which are stored on the cloud service; and
   one or more client devices, wherein each client device of the one or more client devices communicates with the cryptographic key service in order to provide the data files and in order to request encryption or decryption of the data files;
   wherein the two or more hardware cryptographic servers ($S_i$) of the cryptographic key service use the two or more file encryption keys ($K_{F\_j}$) to: in a distributed manner, encrypt the data files and provide the encrypted data files to the cloud service, and, in a distributed manner, decrypt data files retrieved from the cloud service that were encrypted using the two or more file encryption keys ($K_{F\_j}$),
   wherein the two or more hardware cryptographic key servers ($S_i$) of the cryptographic key service generate one or more new cryptographic key(s) ($K_j'$) and generate new file encryption key(s) ($K_{F\_j}'$) based on the new cryptographic key(s) ($K_j'$) and re-encrypt the data files, encrypted with the two or more file encryption keys, stored in the cloud service using the new file encryption key(s) ($K_{F\_j}'$) without decrypting the encrypted data files.

2. The system according to claim 1, wherein the two or more hardware cryptographic key servers ($S_i$) are arranged to communicate with each other in order to share at least some of the cryptographic keys ($K_j$) among some of the two or more cryptographic key servers ($S_i$).

3. The system according to claim 2, wherein the number of cryptographic keys ($K_j$) is larger than the number of the two or more cryptographic key servers ($S_i$).

4. The system according to claim 1, further comprising an access control service arranged to control access to data files held by the cloud service, for users requesting access to the data via a client device from the one or more client devices.

5. The system according to claim 4, wherein the access control service forms part of the cryptographic key service.

6. A method for managing confidential data in a cloud service, the method comprising the steps of:

contacting a cryptographic key service, via a client device, with a request to encrypt or decrypt data files comprising confidential data, wherein the cryptographic key service comprising two or more cryptographic key servers ($S_i$) comprising at least a first and a second cryptographic key server, providing information to the cryptographic key service regarding the data files, wherein the information comprises metadata identifying the data files, computing two or more file encryption keys independently and separately by computing at each of the two or more cryptographic key servers ($S_i$) one or more file encryption key(s) ($K_{F\_j}$), where each file encryption key ($K_{F\_j}$) is computed at one of the respective two or more cryptographic key servers ($S_i$); wherein each of the one or more file encryption key(s) ($K_{F\_j}$) created at a specific one of the two or more cryptographic key servers ($S_i$) are required to be computed using a cryptographic key ($K_j$) previously generated by that specific cryptographic key server ($S_i$), wherein the one or more file encryption key(s) ($K_{F\_j}$) are distinct from one another and are generated based on the information regarding the data files, and at least two file encryption keys ($K_{F\_j}$) computed by at least two different servers from the two or more hardware cryptographic key servers ($S_i$) are required to encrypt and decrypt said data files which are stored on an untrusted cloud service;

wherein the process of previously generating the one or more cryptographic keys ($K_j$) comprises:

the first cryptographic key server ($S_i$) producing at least one cryptographic key(s) not produced by any of the other cryptographic key servers from the two or more cryptographic key servers and said second cryptographic key server ($S_i$) producing at least one or more additional cryptographic key(s) ($K_j$), not produced by any of the other cryptographic key servers from the two or more cryptographic key servers ($S_i$), wherein no single cryptographic key server from the two or more cryptographic key servers ($S_i$) possesses knowledge of all cryptographic key(s) ($K_j$) generated by said cryptographic key service;

wherein the two or more hardware cryptographic key servers ($S_i$), in a distributed manner, encrypt the data files using at least two of the file encryption key(s) ($K_{F\_j}$) computed by the two or more cryptographic key servers ($S_i$) and provide the encrypted data to the untrusted cloud service, and the two or more hardware cryptographic key servers ($S_i$) retrieve the encrypted data from the cloud service, and, in a distributed manner, decrypt the encrypted data files using at least two of the file encryption keys ($K_{F\_j}$) computed by at least two different servers from the two or more cryptographic key servers ($S_i$), generating, by the cryptographic key service, one or more new cryptographic key(s) ($K_j'$), generating new file encryption keys ($K_{F\_j}'$) based on the new cryptographic keys ($K_j'$), and re-encrypting one or more encrypted data files stored in the cloud service, using the new file encryption key(s) ($K_{F\_j}'$), without decrypting the encrypted data files.

7. The method according to claim 6, further comprising the steps of:

a user contacting an access control service in order to request access to data in the cloud service, and the access control service granting or denying access to the requested data based on previously provided access information data.

8. The method according to claim 7, further comprising the steps of:

the user granting access permission to data in the cloud service for another user, and communicating the granted access permission to the access control service, and the access control service updating the access information data in accordance with the granted access permission.

9. The method according to claim 6, further comprising the step of at least some of the two or more cryptographic key servers ($S_i$) sharing a generated cryptographic key ($K_j$) with some of the other cryptographic key servers ($S_i$).

10. The method according to claim 6, wherein encrypting or decrypting data files comprise(s) computing two or more bit streams on the basis of the computed file encryption keys ($K_{F\_j}$).

11. The method according to claim 6, further comprising the steps of:

a user providing altered information to the cryptographic key service, regarding an encrypted data file stored in the cloud service, computing by at least some of the two or more cryptographic key servers ($S_i$), the new file encryption keys ($K_{F\_j}'$), based on the altered information regarding the data file, and using one or more of the cryptographic keys ($K_j$), re-encrypting the data file using at least some of the new file encryption keys ($K_{F\_j}$), and storing the re-encrypted data file in the cloud service.

* * * * *